United States Patent [19]

Nickerson

[11] 4,342,293
[45] Aug. 3, 1982

[54] VALVE GUIDE AND METHOD FOR MAKING SAME

[75] Inventor: James W. Nickerson, Mobile, Ala.

[73] Assignee: Teledyne Industries, Inc., Los Angeles, Calif.

[21] Appl. No.: 115,345

[22] Filed: Jan. 25, 1980

[51] Int. Cl.³ .............................................. F01L 3/08
[52] U.S. Cl. ...................... 123/188 GC; 29/156.7 R
[58] Field of Search ............... 123/188 AA, 188 GC; 29/156.7 R; 148/16.6

[56] References Cited

U.S. PATENT DOCUMENTS

| | | | |
|---|---|---|---|
| 1,697,083 | 1/1929 | Phillips | 123/188 AA |
| 1,800,340 | 4/1931 | Daisley | 123/188 GC |
| 2,632,235 | 3/1953 | Doyle et al. | 29/156.7 R |
| 2,778,352 | 1/1957 | Kimberly | 123/188 GC |
| 2,813,524 | 11/1957 | Brenneke | 123/188 GC |

FOREIGN PATENT DOCUMENTS 553397  5/1943  United Kingdom ........... 29/156.7 R

Primary Examiner—Craig R. Feinberg
Assistant Examiner—W. R. Wolfe
Attorney, Agent, or Firm—Gifford, VanOphem, Sheridan & Sprinkle

[57] ABSTRACT

A valve guide for the stem of a valve in an internal combustion engine is provided having an inner bore through which the stem of the valve is longitudinally positioned, the inner bore surface of the body being nitrided in order to harden the body about the surface through which the valve stem is slidably positioned. The body is completely formed prior to installation of the body in the engine valve guide bore.

3 Claims, 4 Drawing Figures

VALVE GUIDE AND METHOD FOR MAKING SAME

BACKGROUND OF THE INVENTION

I. Field of the Invention

The present invention relates to internal combustion engines and, more particularly, to a valve guide construction for the intake or exhaust valve on such internal combustion engines.

II. Description of the Prior Art

In previously known internal combustion engines, and particularly aircraft reciprocating piston engines, the valve guide has been fabricated from niresist material (cast iron matrix) and installed in the valve guide bores in the cylinder head during construction of the cylinder head assembly. Once the guide is installed within the cylinder head, the guide is reamed to its final desired size. Other materials, such as tin bronze, aluminum bronze and gray iron have also been used to fabricate valve guides in a similar fashion.

This previously known method of reaming the valve guide to its final size after installation of the valve guide in the cylinder head was preferred because of the necessity of insuring concentricity and perpendicularity of the valve guide and thus the valve with the valve seat. Thus, by reaming the valve guide to its final size after installation in the cylinder head, all variations in dimension between the valve guide, the valve and the seat are automatically compensated for.

The materials previously used for the valve guide have been sufficiently ductile to permit mass machining of the valve guides and specifically the reaming of the valve guide bore after installation of the valve guide in the cylinder head. If a material harder than the niresist material were used for the valve guides, the manufacturing process of reaming the valve guide to its final size would likewise increase in difficulty and render it unsuitable for mass production.

The use of the relatively ductile materials for the valve guides, however, is disadvantageous in that the valve guides wear relatively rapidly during operation of the engine. Excessively worn valve guides result in high oil consumption due to leakage around the valve stem which likewise results in a smokey and oil laden exhaust. Similarly, excessive valve guide wear also causes excessive crankcase pressure with oil blowover.

Most importantly badly worn valve guides also result in burning of both the valve and its valve seat and thus weaken the exhaust valve stems due to improper valve seating. After prolonged engine operation, a worn valve seat results in premature cylinder replacement. Burnt exhaust valve seats can induce preignition with its catastrophic results thus necessitating a complete engine overhaul.

SUMMARY OF THE PRESENT INVENTION

The present invention overcomes the above mentioned disadvantages of the previously known valve guides by providing a valve guide which is completely preformed and hardened prior to installation within the engine valve guide bore.

In brief, the valve guide according to the present invention comprises a tubular and cylindrical body having an inner bore surface and an outer cylindrical periphery.

The inner bore of the valve guide is machined or reamed exteriorly of the engine cylinder head to a dimension near its final desired size. Following this machining of the valve guide throughbore, the inner bore surface of the valve guide is nitrided and heat treated thus hardening the inner bore surface of the valve guide body. Preferably, the valve guide body is bronze plated on its outer peripheral surface so that only the inner bore surface of the valve guide body is nitrided.

After nitriding, the valve guide bore is honed to a predetermined finish diameter thus removing the nitride "white layer" and producing a desired smooth finish on the inner bore surface of the valve guide body. The "white layer" is a flaky material which if not removed could flake off during engine operation and thereby cause the valve to jam. Both the nitriding and honing of the valve guide body is performed in a free state, i.e., with the valve guide body removed from its cylinder head valve guide bore.

Following the manufacture of the valve guide body, the valve guide body is pressfitted into the receiving valve guide bore in the cylinder head. Preferably, the predetermined diameter to which the valve guide bore is honed is slightly greater than the desired final diameter of the valve guide bore. This construction ensures that after the slight crush from the interference fit between the cylinder head and the valve guide body, the valve guide bore will attain its desired final bore diameter.

The nitriding creates a hard and wear resistant surface on the inner bore surface of the valve guide body and these properties are retained even when the valve guide is operated at an elevated temperature environment as would be present when the valve guide is used with an exhaust valve. The valve guide according to the present invention is further advantageous in that the inner bore surface resists galling and metal removal even under conditions of elevated temperatures and insufficient lubrication.

BRIEF DESCRIPTION OF THE DRAWINGS

A better understanding of the present invention will be had upon reference to the following detailed description of a preferred embodiment of the present invention when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
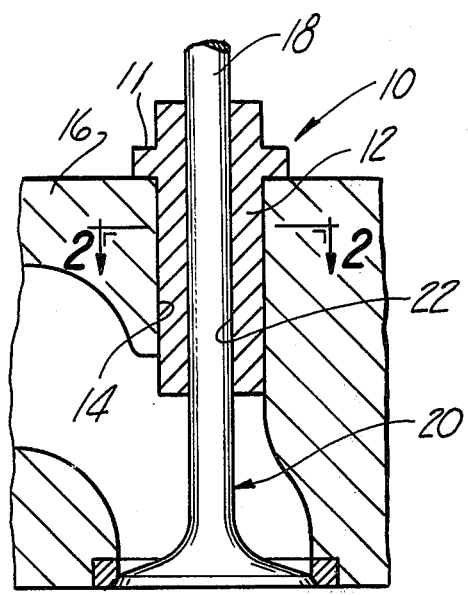
FIG. 1 is a fragmentary sectional view illustrating a valve guide according to the present invention installed in an internal combustion engine.
Figure 2:
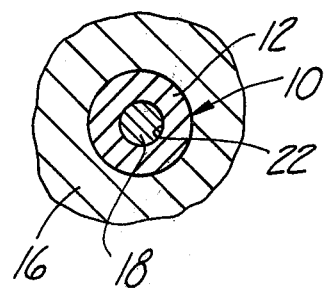
FIG. 2 is a fragmentary sectional view taken substantially along line 2—2 in FIG. 1.

With reference first to FIGS. 1 and 2, a preferred embodiment of the present invention is illustrated as comprising a valve guide which comprises an elongated tubular and cylindrical body 12 constructed from nitralloy steel. As shown in FIGS. 1 and 2, the valve guide 10 is positioned within a valve guide receiving bore 14 of a cylinder head 16 of an internal combustion engine while an elongated cylindrical stem 18 of an engine valve 20 is axially longitudinally positioned through the interior bore 22 of the valve guide 10. An upper flange portion 11 positions the valve guide 10 in the cylinder head 16. The internal combustion engine is, for example, a reciprocating piston aircraft engine while the valve 20 is either an exhaust or intake valve for the engine.

Figure 3:
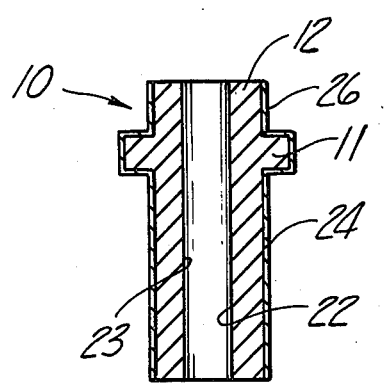
FIG. 3 is a fragmentary sectional view illustrating one step in the manufacture of a valve guide according to the present invention.

Referring now to FIG. 3, both the outer periphery 24 and the inner bore 22 of the valve guide body 12 are initially machined while the valve guide 10 is in a free state, i.e., with the valve guide 10 removed from the engine valve guide bore 14. In addition, the interior bore 22 is reamed to its near finish diameter for a reason to be subsequently described.

Still referring to FIG. 3, the surface 23 of the interior bore 22 of the valve guide body 12 is hardened by a nitriding process. Moreover, to ensure that only the interior bore surface 23 is nitrided and not the outer periphery 24 of the valve guide 10, the valve guide body 12 is preferably bronze plated on its outside surface 24 to form a thin outer bronze covering 26 on the valve guide body 12. After the outer periphery 24 of the valve guide body 12 has been bronze plated as shown at 26, the interior bore surface 22 of the valve guide body 12 is nitrided.

Although any conventional nitriding process can be used on the interior bore surface 22 of the valve guide body 12, in the preferred form of the invention the valve guide 10 is placed in a retort with dissociated ammonia gas at approximately 970° F. for an extended period of time, for example forty (40) hours.

After nitriding, the interior bore surface 23 is honed to a specified finish diameter thus removing the so-called nitride "white layer" and producing a smooth finish on the interior bore surface 23 of the valve guide body 12. The predetermined finish diameter to which the interior bore 22 is honed is slightly larger than the desired final size of the valve guide bore 22 for a reason to be subsequently described.

Figure 4:
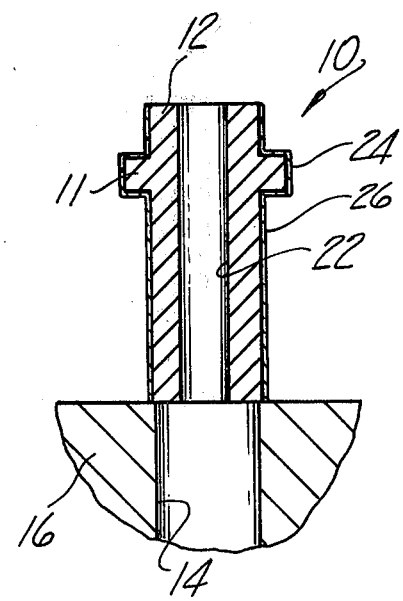
FIG. 4 is a fragmentary sectional view illustrating the installation of the valve guide in the cylinder head of valve guide bore.

With reference now to FIG. 4, after the valve guide body 12 has been completely machined and preformed in a free state, i.e., removed from the valve guide bore 14, the valve guide body 12 is press fit into the valve guide bore 14 of the engine cylinder head 16. The outer periphery 24 of the valve guide body 12 including the bronze plating 26 has a diameter slightly greater than the diameter of the valve guide bore 14 (exaggerated for clarity in FIG. 4) so that a interference fit is formed between the valve guide 10 and the cylinder head 16. This interference fit, compresses the valve guide body 12 thus slightly radially inwardly reducing the interior bore 22 of the valve guide 10 to its desired final size for receiving the stem 18 of the engine valve 20 to the running clearances specified by the engine manufacturer. The bronze plating 26 aids in fitting the valve guide 10 into the bore 14 by providing lubrication and by providing a surface which will not gall as readily as the surface 24.

The nitriding of the interior bore surface 23 of the valve guide 10 imparts a hard and wear resistant surface to the valve guide bore 22. Moreover, these properties are retained even in the elevated temperature environment in which the exhaust valve guides for the engine must operate. In addition, the nitrided inner bore surface 23 of the valve guide 10 resists galling and metal transfer from the movement of the valve stem 18 even under conditions of elevated temperature and scant lubrication.

From the foregoing it can be seen that the valve guide 10 according to the present invention provides an improved valve guide which is entirely machined exteriorly of the engine and only after the valve guide 10 has been entirely formed is the valve guide press fit into its receiving valve guide bore in the engine. Moreover, test and field results have shown a marked improvement utilizing the valve guide according to the present invention over any previously known exhaust valve guides.

Having described my invention, however, many modifications thereto have become apparent to those skilled in the art to which it pertains without deviation from the spirit of the invention as defined by the scope of the appended claims.

I claim:

1. A valve guide for a stem of a valve in an internal combustion engine having a valve guide bore, said valve guide comprising:
   a tubular and cylindrical body having an outer surface and an outer diameter dimensioned to fit at least partially into said valve guide bore and an inner bore through which the valve stem is longitudinally positioned;
   the inner bore of the body being nitrided to harden the body around the inner bore;
   said body being completely formed prior to installation of said body in said valve guide bore, and
   wherein the outer surface of said body is bronze plated.

2. The invention as defined in claim 1 wherein only the inner bore is nitrided.

3. The invention as defined in claim 1 wherein the inner bore of the body is honed after the inner bore is nitrided.

Disclaimer and Dedication

4,342,293.—*James W. Nickerson,* Mobile, Ala. VALVE GUIDE AND METHOD FOR MAKING SAME. Patent dated Aug. 3, 1982. Disclaimer and Dedication filed Apr. 1, 1985, by the assignee, *Teledyne Industries, Inc.*

Hereby disclaims and dedicates to the Public the remaining term of said patent.

*[Official Gazette June 4, 1985.]*